United States Patent
Yamanaka et al.

(10) Patent No.: US 11,420,340 B2
(45) Date of Patent: Aug. 23, 2022

(54) SUCTION HAND AND INDUSTRIAL ROBOT PROVIDED WITH THE SAME

(71) Applicant: DENSO WAVE INCORPORATED, Aichi-pref. (JP)

(72) Inventors: Masaki Yamanaka, Chita-gun (JP); Takayuki Saito, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 16/943,340

(22) Filed: Jul. 30, 2020

(65) Prior Publication Data

US 2021/0031382 A1 Feb. 4, 2021

(30) Foreign Application Priority Data

Jul. 30, 2019 (JP) .............................. JP2019-140280

(51) Int. Cl.
 *B25J 15/06* (2006.01)
 *F04C 18/12* (2006.01)

(52) U.S. Cl.
 CPC ......... *B25J 15/0616* (2013.01); *F04C 18/126* (2013.01)

(58) Field of Classification Search
 CPC ..... B25J 15/0616; B25J 15/0675; B66C 1/02; F04C 18/126
 USPC ................................................... 294/183, 185
 See application file for complete search history.

(56) References Cited

U.S. PATENT DOCUMENTS

| | | | | |
|---|---|---|---|---|
| 3,865,359 A | * | 2/1975 | Caroli | B66C 1/025 269/21 |
| 4,453,755 A | * | 6/1984 | Blatt | B66C 1/0212 294/64.2 |
| 4,474,260 A | * | 10/1984 | Valentine | B25J 15/0616 181/230 |
| 4,905,370 A | * | 3/1990 | Hineno | H05K 13/0413 29/740 |
| 2010/0244344 A1 | * | 9/2010 | Mougin | B65B 23/08 269/21 |
| 2015/0212508 A1 | | 7/2015 | Miyoshi | |
| 2018/0058619 A1 | * | 3/2018 | Hukelmann | F16L 55/0338 |
| 2019/0054635 A1 | * | 2/2019 | Cho | B25J 15/0675 |

* cited by examiner

*Primary Examiner* — Dean J Kramer
(74) *Attorney, Agent, or Firm* — Oliff PLC

(57) ABSTRACT

A robot suction hand mountable on an industrial robot and configured to hold a workpiece by suction using a suction unit. The robot suction hand includes: a vacuum pump incorporated in the robot suction hand. The vacuum pump has a housing in which an intake port and an exhaust port are formed, and configured to intermittently take in air from the intake port and intermittently discharge air from the exhaust port. The robot suction hand includes a suction path that communicates with the suction unit and the intake port and a first member made of a porous material. The first member covers the exhaust port.

14 Claims, 6 Drawing Sheets

SUCTION HAND AND INDUSTRIAL ROBOT PROVIDED WITH THE SAME

CROSS-REFERENCE TO RELATED APPLICATION

This application is based on and claims the benefit of priority from earlier Japanese Patent Application No. 2019-140280 filed Jul. 30, 2019, the description of which is incorporated herein by reference.

BACKGROUND

Technical Field

The present disclosure relates to a suction hand mounted on an apparatus such as a robot when the apparatus is in use, and more specifically relates to a robot suction hand suitable for use with industrial robots that perform suction work for suctioning articles such as workpieces.

Related Art

There have been suction hands configured to be mounted on a robot for holding a workpiece by suction. An example of such suction hands is disclosed in JP-A-2015-139835. In JP-A-2015-139835, a tube for taking in and releasing air is connected to the suction hand.

While one end of the tube is connected to the suction hand, the other end is connected to a vacuum pump, which is disposed at a position separate from the suction hand. For this reason, there is a possibility that the tube may become entangled with the robot during operation of the robot. However, if it is desired not to provide the tube by incorporating the vacuum pump into the suction hand, the vacuum pump is required to be downsized. Further, it is also desired to reduce the noise generated from the suction hand.

SUMMARY

It is thus desired to provide a suction hand with a vacuum pump incorporated therein, the suction hand being configured to be mounted on an apparatus such as a robot, and to reduce the size of the vacuum pump and suppress the noise generated from the suction hand.

A first aspect of the present disclosure is a suction hand mounted on a target apparatus and configured to hold a workpiece by suction using a suction unit, the suction hand including: a vacuum pump incorporated in the suction hand, the vacuum pump having a housing in which an intake port and an exhaust port are formed, and being configured to take in air from the intake port and discharge air from the exhaust port; a suction path that communicates with the suction unit and the intake port; and a first member made of a porous material, the first member covering the exhaust port.

With this configuration, the suction hand is mounted on, for example, an industrial robot, and holds a workpiece by suction using the suction unit.

The vacuum pump has a housing in which an intake port and an exhaust port are formed and is configured to take in air from the intake port and discharge air from the exhaust port. The suction unit communicates with the intake port via the suction path. Therefore, air can be taken in from the intake port to generate a negative pressure in the suction unit so that the suction unit can hold a workpiece by suction. The suction hand incorporates the vacuum pump therein. Since it is not necessary to connect a suction hand and a vacuum pump disposed at a position apart from the suction hand with a tube, a tube will not become entangled with the robot during operation of an apparatus such as an industrial robot.

As the vacuum pump intermittently takes in air from the intake port, a pressure difference of air is generated, and this generates a pulsation sound at the intake port. Further, as the vacuum pump intermittently exhausts air from the exhaust port, a pressure difference of air is generated, and this generates a pulsation sound at the exhaust port, which is larger than that generated at the intake port. Since the first member made of a porous material covers the exhaust port, air is discharged from the exhaust port via the first member. The air discharged from the exhaust port passes through fine gaps formed in the porous material, when passing through the first member. As a result, the pressure difference of air decreases to thereby reduce a pulsation sound (noise) generated at the exhaust port. Further, since the exhaust port is simply covered with the first member made of a porous material, a configuration for reducing the noise can be simplified, and the vacuum pump can be downsized.

In a second aspect of the present disclosure, the first member is made of a sintered material of a stainless steel. With this configuration, the first member can be manufactured at low cost and improved in durability compared with a vacuum pump silencer.

The other advantageous effects of the present disclosure can be made clear based on the following descriptions provided together the accompanying drawings.

DETAILED DESCRIPTION OF THE PREFERRED EMBODIMENTS

With reference to the drawings, an embodiment implemented as an industrial articulated robot configured to hold and transport a workpiece by suction will be described.

Figure 1:
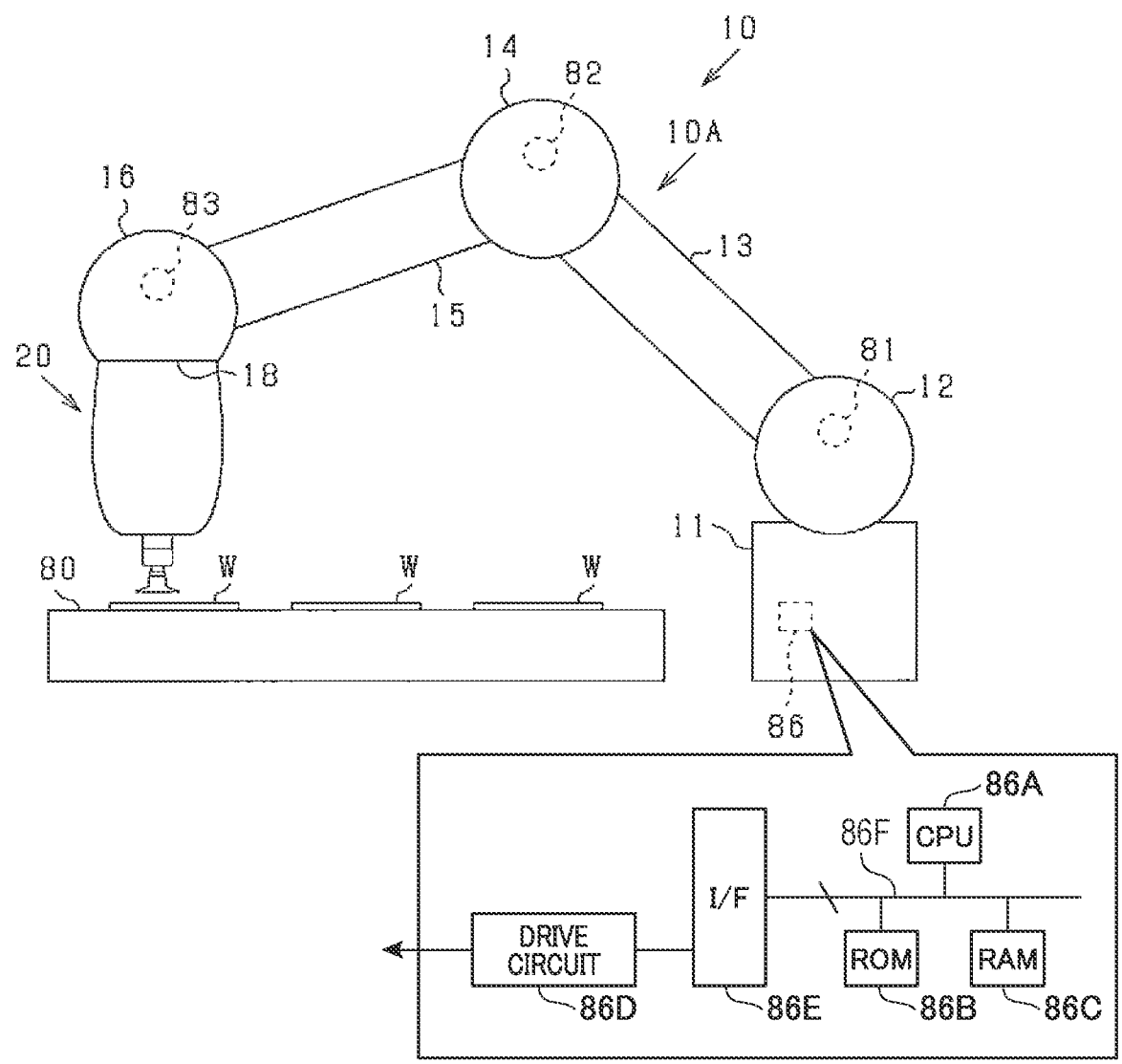
FIG. 1 is a schematic view illustrating a robot and a suction hand.

As shown in FIG. 1, a robot 10 is configured to hold a workpiece W placed on a table 80 by suction using a suction hand 20 and transport it to another place, or lift the workpiece W by suction and put it back on the table 80 after a predetermined period of time.

The robot 10 is, for example, a six-axis vertical articulated robot, and includes a base 11 and an arm 10A. Adjacent links 13 and 15 (partially shown) of the arm 10A are joined by joints 12, 14, and 16 (partially shown) in sequence in a relatively rotatable manner. The joints 12, 14, and 16 are driven by motors (not shown) corresponding to the respective joints 12, 14, and 16.

For example, the joints 12, 14, and 16 of the robot 10 are provided with encoders 81, 82, and 83 for detecting a rotation angle of the joints 12, 14, and 16, respectively. The encoders 81, 82, and 83 detect the position and posture of a control point of the arm 10A. The control point is set at the center of a distal end 18 of the arm 10A. A suction hand 20 is mounted on the distal end 18 of the arm 10A.

The base 11 includes therein a control unit 86 for controlling the operation of the robot 10 and the suction hand 20. The control unit 86 is configured as a computer that includes elements such as a CPU (central processing unit) 86A mainly responsible for arithmetic operations, a ROM (read-only memory) 86B, a RAM (random-access memory) 86C, a drive circuit 86D, and an I/O interface 86E, which are required for controlling the operation of the robot 10 and the suction hand 20. These elements are communicably connected to each other via an internal bus 86F, and connected to the drive circuit 86D via the I/O interface 86E. The ROM 86B is a storage device that also serves as a non-transitory computer readable recording medium, and stores operation programs for the robot 10 and the suction hand 20 and the like in advance so as to be readable by the CPU 86A. The RAM 86C is configured to be capable of temporarily storing the data that are being processed by the CPU 86A. The control unit 86 controls the operation of the robot 10 and the suction hand 20 by the CPU 86A executing the programs stored in the ROM 86B. The CPU 86A may be any element that is mainly responsible for arithmetic operations in a computer system, and may be referred to as another name such as a processor or an arithmetic unit as long as it has a similar function.

A plurality of sheet-shaped (thin) workpieces W are placed on the table 80. The workpieces W may be electronic substrates, for example. A grip hand having a pair of gripping claws has difficulty in gripping and transporting the sheet-shaped workpieces W. Therefore, the robot 10 holds and transports the workpiece W by suction using the suction hand 20.

Figure 2:
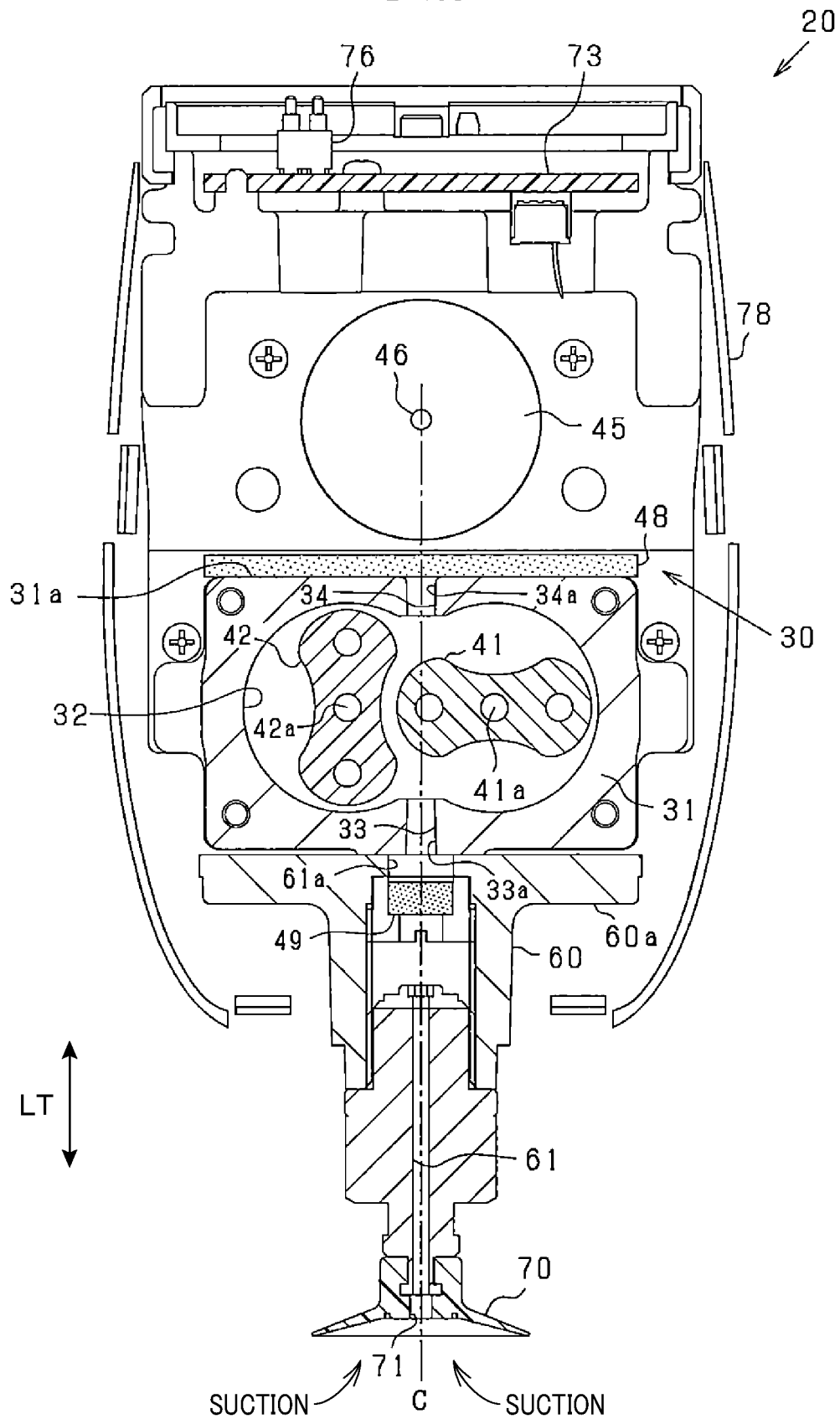
FIG. 2 is a front cross-sectional view of the suction hand.
Figure 3:
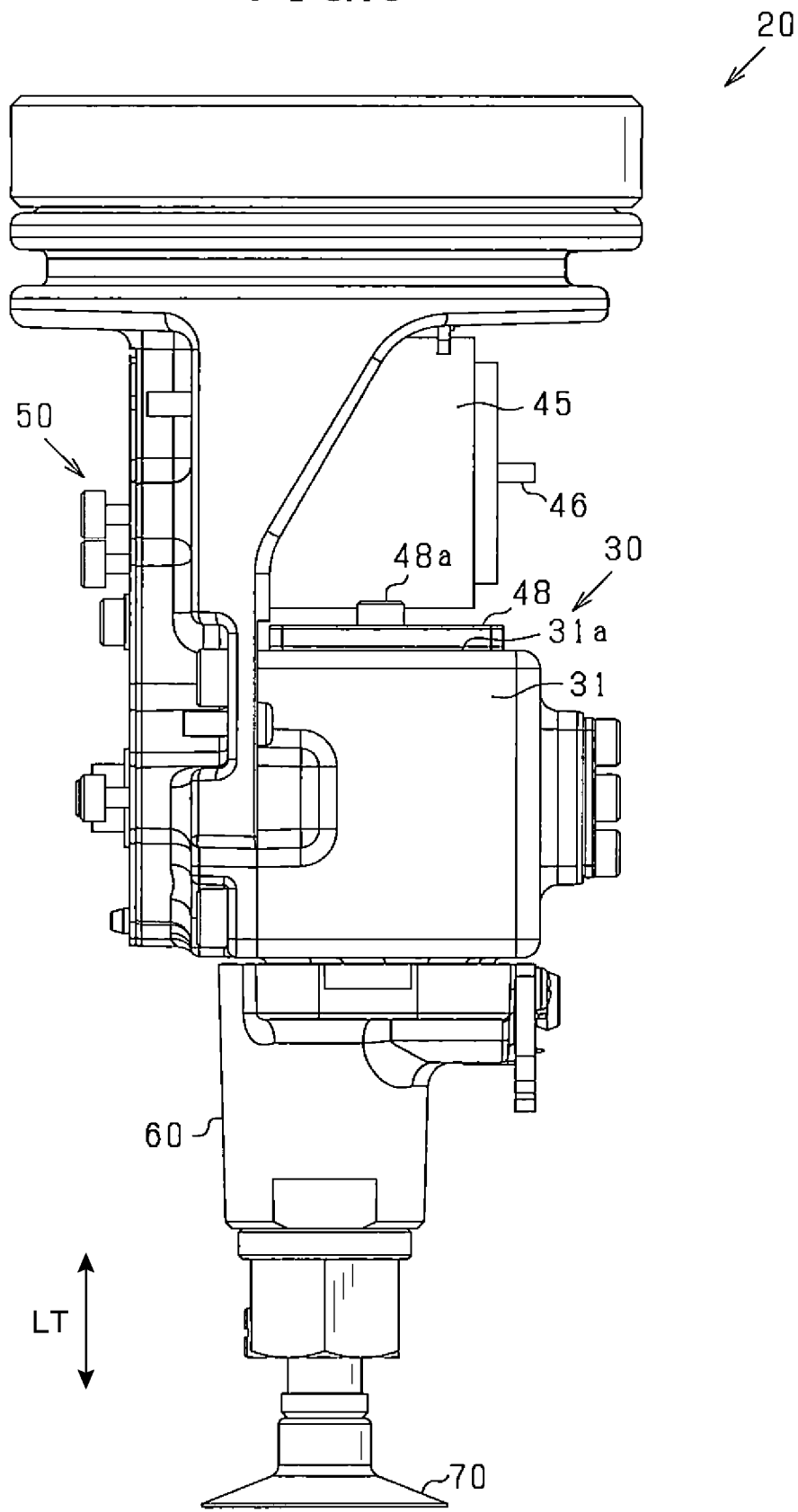
FIG. 3 is a side view of the suction hand with a case removed.
Figure 4:
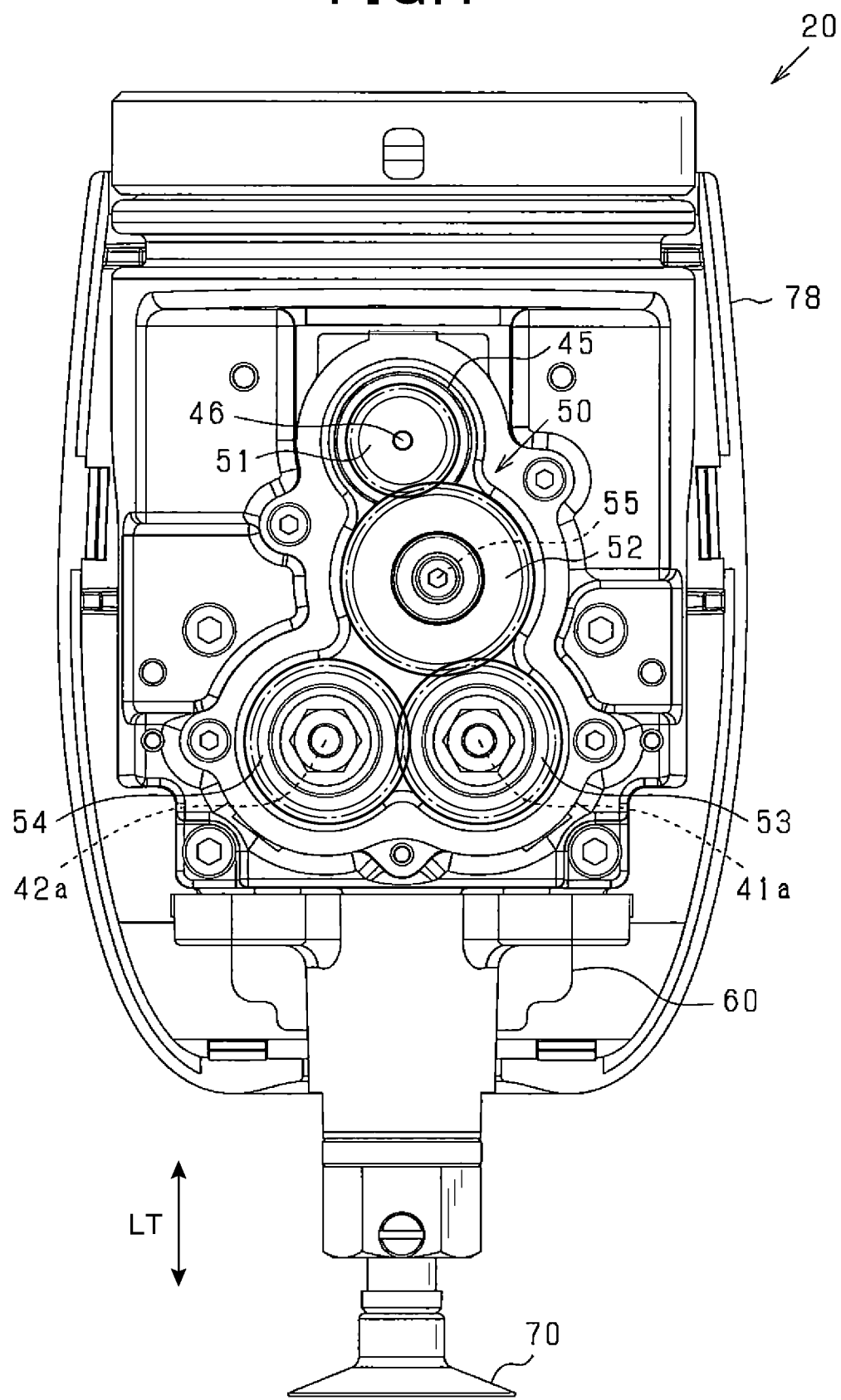
FIG. 4 is a rear view of the suction hand with the case partially omitted.

FIG. 2 is a front cross-sectional view of the suction hand 20. FIG. 3 is a side view of the suction hand 20 with a case 78 removed. FIG. 4 is a rear view of the suction hand 20 with the case 78 partially omitted. As shown in FIG. 2, the suction hand 20 (robot suction hand) includes a vacuum pump 30, a head unit 60, a suction cup 70, a substrate 73, a connector 76, the case 78, and the like. The vacuum pump 30, the substrate 73, and the connector 76 are incorporated in the suction hand 20.

The vacuum pump 30 is a positive displacement rotary pump, and specifically a Roots pump. The vacuum pump 30 includes a housing 31, rotors 41 and 42, a motor 45, a gear mechanism 50, and the like.

The housing 31 is formed in a cuboid shape made of a metal or the like, and has a rotor chamber 32 formed therein. The rotor chamber 32 is a space that accommodates the rotors 41 and 42 such that the rotors 41 and 42 are rotatable. The rotor chamber 32 communicates with the outside of the housing 31 through an intake path 33 and an exhaust path 34, which are formed in the housing 31. The intake path 33 and the exhaust path 34 are formed in a straight shape, and arranged on the same straight line C. The straight line C extends in the same direction as the longitudinal direction LT (showing an axial direction or a height direction) of the suction hand 20. An opening of the intake path 33 open to the outside the housing 31 is an intake port 33a. An opening of the exhaust path 34 open to the outside the housing 31 is an exhaust port 34a. The exhaust port 34a is formed in a cone shape (inverted taper shape) with a diameter expanding from the inside to the outside of the housing 31.

A first rotation shaft 41a of the first rotor 41 and a second rotation shaft 42a of the second rotor 42 are disposed on a plane perpendicular to the straight line C. That is, in side view of the suction hand 20, the straight line C (corresponding to the longitudinal direction LT of the suction hand 20) and the rotation shafts 41a and 42a are perpendicular to each other. The first rotation shaft 41a and the second rotation shaft 42a extend parallel to each other. The rotors 41 and 42 are two-lobe rotors made of a metal or the like, and have concave and convex teeth that mesh with each other. As the rotors 41 and 42 rotate, air is taken in from the intake port 33a and discharged from the exhaust port 34a. The rotors 41 and 42 rotate at 4,000 rpm, for example. The rotors 41 and 42 (vacuum pump 30) intermittently take in air from the intake port 33a, and intermittently exhaust air from the exhaust port 34a.

The motor 45 (electric motor) is, for example, a DC motor driven by DC power. An output shaft 46 of the motor 45 extends perpendicular to the straight line C. The output shaft 46 of the motor 45 extends parallel to the rotation shafts 41a and 42a. The motor 45 is on the opposite side of the housing 31 than the suction cup 70 is. A predetermined gap is formed between the motor 45 and the housing 31.

As shown in FIG. 3, the gear mechanism 50 is disposed on one side (left side) in an axial direction of the output shaft 46 of the motor 45 (in FIG. 3, horizontal direction), whereas the motor 45 and the housing 31 are disposed on the other side. That is, the motor 45 and the housing 31 are disposed on the same side relative to the gear mechanism 50.

The gear mechanism 50 (transmission mechanism) transmits a rotational force of the motor 45 to the rotors 41 and 42. As shown in FIG. 4, the gear mechanism 50 includes gears 51 to 54 and an intermediate shaft 55. The output gear 51 is mounted on the output shaft 46 of the motor 45. The intermediate shaft 55 extends parallel to the output shaft 46 and the rotation shafts 41a and 42a. The intermediate gear 52 is mounted on the intermediate shaft 55. The output gear 51 and the intermediate gear 52 mesh with each other. The first gear 53 is mounted on the first rotation shaft 41a of the first rotor 41. The intermediate gear 52 and the first gear 53 mesh with each other. The second gear 54 is mounted on the second rotation shaft 42a of the second rotor 42. The first gear 53 and the second gear 54 mesh with each other.

The rotational force of the output shaft 46 of the motor 45 is transmitted to the first rotation shaft 41a of the first rotor 41 via the output gear 51, the intermediate gear 52, and the first gear 53. Accordingly, the first rotor 41 is rotated. Further, the rotational force of the output shaft 46 of the motor 45 is transmitted to the second rotation shaft 42a of the second rotor 42 via the output gear 51, the intermediate gear 52, the first gear 53, and the second gear 54. Accordingly, the second rotor 42 is rotated. The first rotor 41 and the second rotor 42 rotate in opposite directions from each other at the same rotation speed.

As shown in FIGS. 2 and 3, the head unit 60 is disposed on the opposite side of the housing 31 than the motor 45 is. The head unit 60 is made of metal or the like, and has a cylindrical tubular shape provided with a flange 60a. A suction path 61 extending in a direction of the straight line C (corresponding to the longitudinal direction LT of the suction hand 20) is formed inside the head unit 60. The suction path 61 has a straight shape. Accordingly, the suction path 61, the intake port 33a, and the exhaust port 34a are arranged on the same straight line C. The suction cup 70 is mounted on the distal end of the head unit 60 (the end facing away from the housing 31). That is, the suction cup 70 is disposed at the distal end in the longitudinal direction LT of the suction hand 20. Accordingly, the suction cup 70, the suction path 61, the housing 31, and the motor 45 are arranged in this order in the direction of the straight line C.

The suction cup 70 (suction unit) is made of rubber or the like into a disc shape. The suction cup 70 has a through hole 71. The through hole 71 extends in the direction of the straight line C, penetrating the suction cup 70. The intake port 33a of the housing 31 communicates with the through hole 71 through the suction path 61. Therefore, as air is taken in from the intake port 33a, air is taken in through the through hole 71 of the suction cup 70. Accordingly, a negative pressure is applied inside the suction cup 70 so that the suction cup 70 holds the workpiece W by suction.

The substrate 73 includes a power supply circuit that supplies electric power to the motor 45, a control circuit that controls driving of the motor 45, and the like. The substrate 73 is connected to a cable (not shown) of the arm 10A via the connector 76. The substrate 73 receives power and signal from the control unit 86 via the cable. Based on the signal received from the control unit 86, the substrate 73 controls driving of the motor 45. Thus, the operation of the suction hand 20 is controlled.

The suction hand 20 is provided with the case 78. The vacuum pump 30 and the substrate 73 are accommodated in the case 78.

In this configuration, the vacuum pump 30 is downsized so that it can be incorporated in the suction hand 20. Accordingly, the motor 45 that drives the rotors 41 and 42 of the vacuum pump 30 is also downsized. When the motor 45 is downsized, a load applied to the motor 45 in driving of the rotors 41 and 42 increases, which may cause an excessive increase in temperature of the motor 45 and thus temperature of the suction hand 20.

According to the present embodiment, the motor 45 is disposed at a position facing the exhaust port 34a of the housing 31. In other words, the motor 45 is disposed at a position on the extension line (straight line C) of the exhaust path 34 extending from the inside of the housing 31 to the exhaust port 34a. Therefore, air discharged from the exhaust port 34a is blown onto the motor 45, and cools the motor 45.

If the size of the exhaust port 34a is not sufficiently large for the size of the motor 45, air discharged from the exhaust port 34a may be blown onto only a part of the motor 45. In this case, there is a possibility that the effect of cooling the motor 45 by the discharged air may be lowered.

In this regard, the exhaust port 34a is formed in a cone shape (inverted taper shape) with a diameter expanding from the inside to the outside of the housing 31. Accordingly, air discharged from the exhaust port 34a flows, spreading toward the motor 45.

In the housing 31, the intake port 33a is open toward the suction cup 70 in the direction of the straight line C, whereas the exhaust port 34a is open in a direction away from the suction cup 70. The rotation shafts 41a and 42a of the rotors 41 and 42, respectively, extend perpendicular to the direction of the straight line C (parallel to a plane perpendicular to the straight line C). If one of the rotation shafts 41a and 42a of the rotors 41 and 42 is formed integrally with the output shaft 46 of the motor 45 to simplify the configuration of the suction hand 20, the motor 45 is positioned in the axial direction of the rotation shaft 41a or 42a relative to the housing 31. In this case, the motor 45 cannot be disposed at a position facing the exhaust port 34a.

In this embodiment, the output shaft 46 of the motor 45 extends parallel to the rotation shafts 41a and 42a of the rotors 41 and 42, and the gear mechanism 50 is disposed on one side in the axial direction of the output shaft 46 whereas the motor 45 and the housing 31 are disposed on the other side. Accordingly, the rotational force of the motor 45 is transmitted to the rotors 41 and 42 via the gear mechanism 50.

Further, when the suction hand 20 transitions from a state in which the suction cup 70 does not hold the workpiece W to a state in which the suction cup 70 holds the workpiece W, the air taken in from the intake port 33a and the air discharged from the exhaust port 34a gradually decrease. However, the suction cup 70 and the workpiece W are not completely in contact with each other, forming a slight gap between the suction cup 70 and the workpiece W. Accordingly, while air is taken in through the gap, air is allowed to be continuously discharged from the exhaust port 34a. Further, at the exhaust port 34a, a backflow of air occurs due to the pressure difference of air. Accordingly, air that has flowed backward is again discharged from the exhaust port 34a. Thus, air is continuously discharged from the exhaust port 34a. Therefore, even when the workpiece W is held by suction by the suction hand 20, the motor 45 can be cooled by air. When the motor 45 is stopped in the state in which the workpiece W is not held by suction by the suction hand 20, air is no longer discharged from the exhaust port 34a. In this case, however, since the motor 45 is no longer heated, the temperature of the motor 45 does not excessively increase.

Further, the vacuum pump 30 intermittently takes in air from the intake port 33a, and intermittently exhaust air from the exhaust port 34a. As the vacuum pump 30 intermittently takes in air from the intake port 33a, a pressure difference of air is generated, and this generates a pulsation sound at the intake port 33a. Further, as the vacuum pump 30 intermittently exhausts air from the exhaust port 34a, a pressure difference of air is generated, and this generates a pulsation sound at the exhaust port 34a, which is larger than that generated at the intake port 33a. While the first rotation shaft 41a of the first rotor 41 makes one rotation, the number of rotors (2)×the number of rotor lobes (2)=4 pulsation sounds are generated at the exhaust port 34a. Since there may be a situation where the robot 10 and the user (human) collaborate and work in close proximity to each other, it is desired to reduce the noise generated from the suction hand 20.

Therefore, according to the present embodiment, the exhaust port 34a is covered with a first member (a first porous member) 48. That is, the first member 48 covers the opening (position) where a pulsation sound is generated in the vacuum pump 30. The first member 48 is formed of a sintered material of a stainless steel. Accordingly, even when the exhaust port 34a is disposed facing the motor 45 with the first member 48 therebetween, the air discharged from the exhaust port 34a passes through the first member 48 and is blown onto the motor 45. That is, even when the motor 45 is disposed facing the exhaust port 34a with the first member 48 having air permeability or the first member 48 in which an air passage is formed therebetween, the motor 45 can be cooled by air.

The first member 48 is formed in a plate shape having the same shape as a surface 31a (predetermined surface) of the housing 31 in which the exhaust port 34a is formed, and is attached to the surface 31a. Specifically, the first member 48 has a rectangular plate shape having a desired thickness, and is fixed to the housing 31 with a bolt 48a (see FIG. 3). Thus, the first member 48 is in close contact with the surface 31a.

Figure 5:
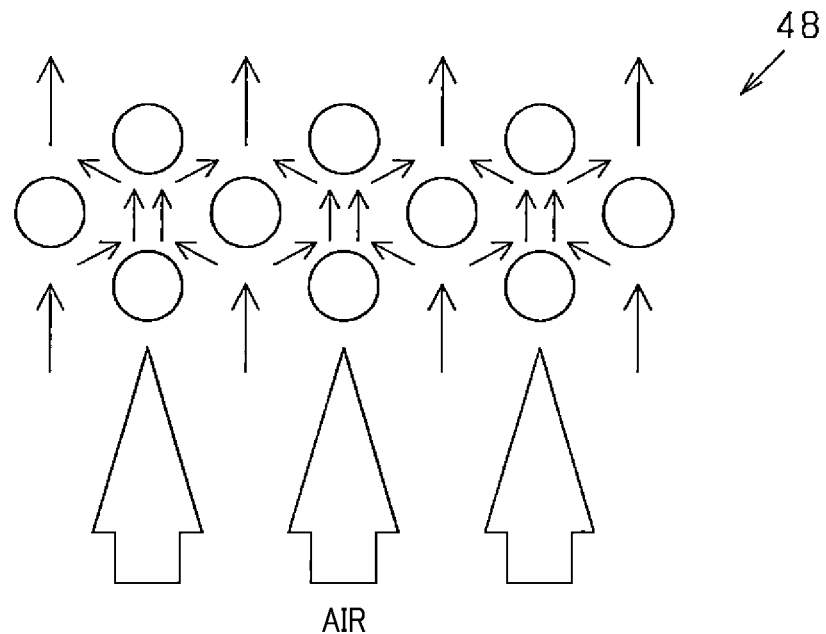
FIG. 5 is a schematic view illustrating air passing through a sintered material.

As the vacuum pump 30 is driven, air is discharged from the exhaust port 34a via the first member 48. As shown in FIG. 5, when air that has discharged from the exhaust port 34a passes through the first member 48, the air passes through fine gaps formed in the sintered material. As a result, the pressure difference of air decreases, and thus a pulsation sound (noise) generated at the exhaust port 34a is reduced.

As described above, as the vacuum pump 30 intermittently takes in air from the intake port 33a, a pressure difference of air is generated, and this also generates a pulsation sound at the intake port 33a.

Therefore, according to the present embodiment, the intake port 33a is covered with a second member (a second porous member) 49. Specifically, the second member 49 covers the intake port 33a via a space 61a, which is formed as a part of the suction path 61 in the head unit 60. That is, the second member 49 covers the opening (position) where a pulsation sound is generated in the vacuum pump 30. The second member 49 is formed of a sintered material of a stainless steel. The second member 49 is formed in a disc shape having a desired thickness.

As the vacuum pump 30 is driven, air is taken in from the intake port 33a via the second member 49 and the space 61a. As with the first member 48 of FIG. 5, when air that has taken in from the intake port 33a passes through the second member 49, the air passes through fine gaps formed in the sintered material. As a result, the pressure difference of air decreases, and thus a pulsation sound (noise) generated at the intake port 33a is reduced.

Figure 6:
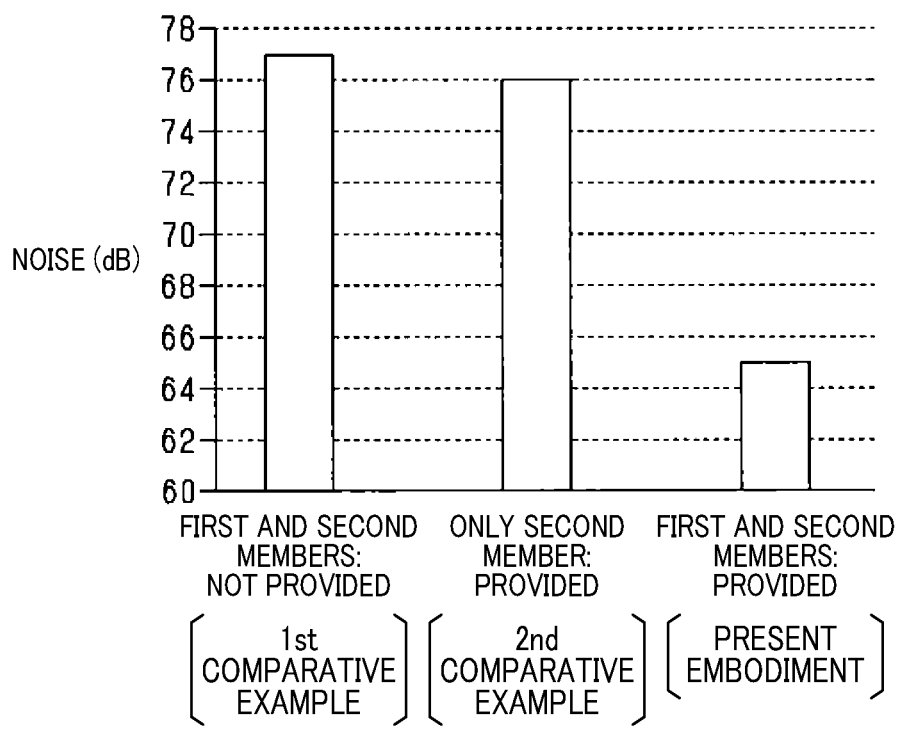
FIG. 6 is a graph showing effects of a first member and a second member.

FIG. 6 is a graph showing effects of the first member 48 and the second member 49. In a first comparative example, which is the same as the present embodiment except that neither the first member 48 nor the second member 49 are provided, the noise is approximately 77 dB. In a second comparative example, which is the same as the present embodiment except that the first member 48 is not provided, the noise is approximately 76 dB. That is, the second member 49 has an effect of reducing the sound by approximately 1 dB. In the present embodiment, the noise is approximately 65 dB. That is, by the combination of the first member 48 and the second member 49, there is provided an effect of reducing the sound by approximately 12 dB.

Figure 7:
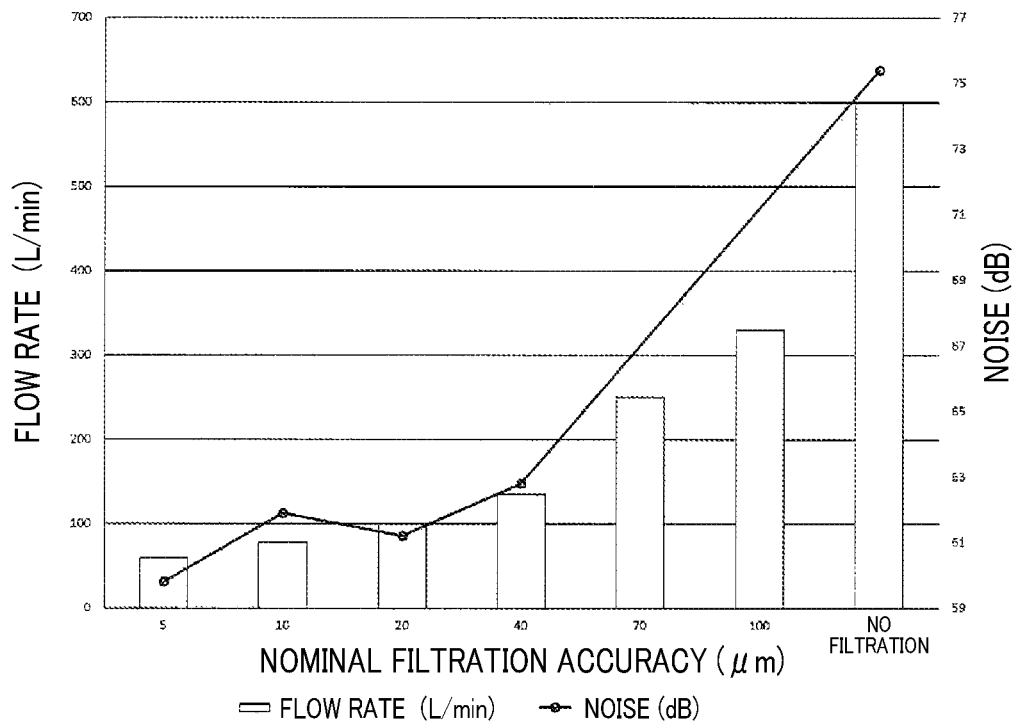
FIG. 7 is a graph showing a relationship between a porosity of the second member and a noise generated from the suction hand.

FIG. 7 is a graph showing a relationship between a size of internal pores (referred to as a nominal filtration accuracy or absolute filtration accuracy, showing an effective pore size) of a porous material constituting the second member 49 disposed at the intake port 33a and a magnitude of noise generated by the second member 49. As shown in FIG. 7, the noise generated when the second member 49 made of a porous material is disposed at the intake port 33a as in the present embodiment is smaller than the noise generated when the second member 49 is not disposed at the intake port 33a. That is, FIG. 7 shows that noise suppression effect is performed when the second member 49 made of a porous material is disposed at the intake port 33a as in the present embodiment. FIG. 7 further shows that the noise suppression effect increases with a decrease in the nominal filtration accuracy of the second member 49. As shown in FIG. 7, noise reduction effect is significant when the nominal filtration accuracy is 40 μm or less.

Further, in the present embodiment, the nominal filtration accuracy of the second member 49 disposed at the intake port 33a may be different from the nominal filtration accuracy of the first member 48 disposed at the exhaust port 34a. Specifically, the nominal filtration accuracy of the second member 49 disposed at the intake port 33a may be 100 μm, and the nominal filtration accuracy of the first member 48 disposed at the exhaust port 34a may be 20 μm. Thus, the nominal filtration accuracy of the second member 49 may be larger than the nominal filtration accuracy of the first member 48. The reason for this is that even the nominal filtration accuracy of 100 μm can achieve a sufficient noise suppression effect as shown in FIG. 7, while the intake port 33a covered with the second member 49 having the nominal filtration accuracy of 100 μm can exhibit a sufficient suctioning force, that is, a force sufficient for the suction hand 20 to suction the workpiece W. In general, the cost is lower for porous materials having the higher nominal filtration accuracy. Therefore, using a porous material having high nominal filtration accuracy for the second member 49 contributes to reduction in manufacturing cost of the suction hand 20. On the other hand, since the first member 48 disposed at the exhaust port 34a is made of a porous material having low nominal filtration accuracy, the noise suppression effect can be enhanced.

Figure 8:
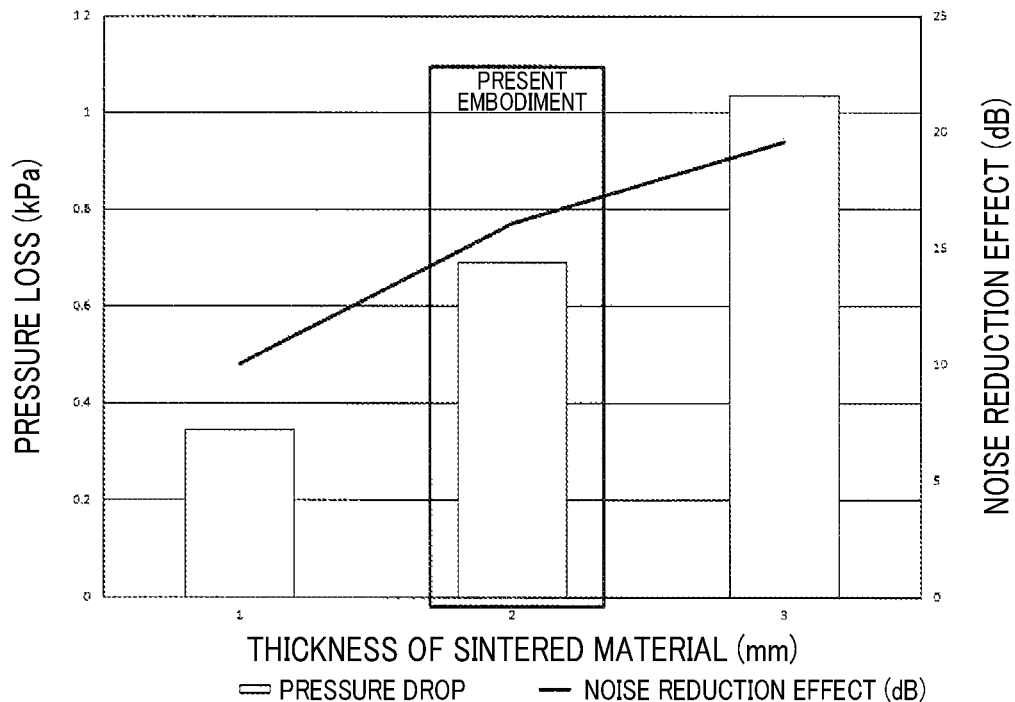
FIG. 8 is a graph showing a relationship between a thickness of a sintered material and a noise reduction effect.

FIG. 8 is a graph showing a relationship between the thickness of the sintered material constituting the first member 48 and the second member 49 and the noise reduction effect (noise suppression effect). As shown in FIG. 8, the greater the thickness of the sintered material, the higher the noise suppression effect. In this embodiment, the sintered material having a thickness of 3 mm or less can achieve a sufficient noise suppression effect. Since the sintered material of the first and second members 48 and 49 with a reduced thickness can achieve a noise suppression effect, noise can be suppressed with a simplified configuration, and the vacuum pump 30 can be downsized.

The present embodiment described in detail above has the following advantages.

The vacuum pump 30 is incorporated in the suction hand 20. Accordingly, since it is not necessary to connect the suction hand 20 and the vacuum pump 30 disposed at a position apart from the suction hand 20 with a tube, a tube will not become entangled with the robot 10 during operation of the robot 10. Since the vacuum pump 30 is a roots pump, it is possible to simplify the configuration and reduce the size.

The motor 45 is disposed at a position facing the exhaust port 34a. In other words, the motor 45 is disposed at a position on the extension line of the exhaust path 34 extending from the inside of the housing 31 to the exhaust port 34a. Therefore, air discharged from the exhaust port 34a is blown onto the motor 45, and cools the motor 45. Accordingly, even when the motor 45 is downsized and a load applied to the motor 45 increases, an excessive increase in the temperature of the motor 45 and thus an excessive increase in the temperature of the suction hand 20 can be prevented.

The exhaust port 34a is formed in an inverted taper shape with a diameter expanding from the inside to the outside of the housing 31. With this configuration, a flow of air discharged from the exhaust port 34a can be widened. Accordingly, the range where air is blown onto the motor 45 can be increased, and thus the effect of cooling the motor 45 by air can be improved.

The suction cup 70 is disposed on the distal end in the longitudinal direction LT of the suction hand 20 (hereinafter, simply referred to as a "longitudinal direction"). Therefore, by controlling the robot 10 so that the longitudinal direction LT of the suction hand 20 is oriented toward the workpiece W, the workpiece W can be held by suction by the suction cup 70 disposed on the distal end in the longitudinal direction LT of the suction hand 20. The intake port 33a is open toward the suction cup 70 in the longitudinal direction. Therefore, the intake port 33a can communicate with the suction cup 70 through the straight suction path 61, and the configuration of the suction hand 20 can be simplified.

The output shaft 46 of the motor 45 extends parallel to the rotation shafts 41a and 42a of the rotors 41 and 42, and the gear mechanism 50 is disposed on one side in the axial direction of the output shaft 46 whereas the motor 45 and the housing 31 are disposed on the other side. Therefore, even if one of the rotation shafts 41a and 42a of the rotors 41 and 42 is not integrally formed with the output shaft 46 of the motor 45, the rotational force of the motor 45 can be transmitted to the rotors 41 and 42. In addition, the suction cup 70, the suction path 61, the housing 31, and the motor 45 are arranged in this order in the longitudinal direction LT. Therefore, in the longitudinal direction LT, the motor 45 can be disposed on the opposite side of the housing 31 than the suction cup 70 is, that is, on a side closer to the opening of the exhaust port 34a. Accordingly, it is possible to achieve a configuration in which the motor 45 is cooled by air discharged from the exhaust port 34a while the suction hand 20 has a simplified configuration.

The suction path 61 has a straight shape. The suction path 61, the intake port 33a, and the exhaust port 34a are arranged on the same straight line C. Accordingly, a distance from the suction cup 70 to the exhaust port 34a can be minimized, and the exhaust efficiency of the vacuum pump 30 can be improved. In addition, since the efficiency of air flowing from the suction cup 70 to the exhaust port 34a can be improved, the effect of cooling the motor 45 by the discharged air can be improved.

Since the first member 48 made of a porous material covers the exhaust port 34a, air is discharged from the exhaust port 34a via the first member 48. The air discharged from the exhaust port 34a passes through fine gaps formed in the porous material, when passing through the first member 48. As a result, the pressure difference of air decreases to thereby reduce a pulsation sound (noise) generated at the exhaust port 34a. Further, since the exhaust port 34a is simply covered with the first member 48 made of a porous material, a configuration for reducing the noise can be simplified, and the vacuum pump 30 can be downsized.

The first member 48 is formed of a sintered material made from stainless steel. With this configuration, the first member 48 can be manufactured at low cost and improved in durability compared with a silencer for the vacuum pump 30.

The second member 49 made of a porous material covers the intake port 33a. Accordingly, a pulsation sound (noise) generated at the intake port 33a can be reduced, and thus a noise generated at the suction hand 20 can be further reduced.

The second member 49 is formed of a sintered material of a stainless steel. With this configuration, the second member 49 can be manufactured at low cost and improved in durability compared with a silencer for the vacuum pump 30.

The exhaust port 34a is formed in an inverted taper shape with a diameter expanding from the inside to the outside of the housing 31. Accordingly, the pressure difference between the air inside the exhaust port 34a and the air outside the exhaust port 34a can be reduced, and thus a pulsation sound (noise) generated at the exhaust port 34a can be reduced.

The first member 48 is formed in a plate shape having the same shape as the surface 31a of the housing 31 in which the exhaust port 34a is formed, and is attached to the surface 31a. With this configuration, the size of the first member 48 can be easily ensured, and the first member 48 can be easily attached to the surface 31a of the housing 31.

The aforementioned embodiment can be implemented with the following modifications. The same components as those of the above embodiment are denoted by the same reference signs, and the description thereof will be omitted.

The shape of the suction path 61 is not limited to a straight shape, and may be a curved shape or a shape having a bent portion.

A sponge type suction pad to which a sponge is attached (suction unit) may also be used instead of the suction cup 70. In this case, air can be taken in through the sponge even when the workpiece W is held by suction by the suction pad. Accordingly, air is allowed to be continuously discharged from the exhaust port 34a to thereby cool the motor 45. Further, a valve or the like can be provided in the head unit 60. When the pressure in the suction path 61 becomes lower than a predetermined pressure, air is introduced into the suction path 61 to maintain the predetermined pressure. An orifice may also be formed in the head unit 60 so that a very small amount of air is introduced into the suction path 61. With these configurations as well, even when the workpiece W is held by suction, air can be continuously discharged from the exhaust port 34a to thereby cool the motor 45.

The exhaust port 34a is not limited to an inverted taper shape, and may also be formed in a hollow cylindrical shape extending in the axial direction with a constant diameter.

The shape of gears of the gear mechanism 50 may be altered such that the output shaft 46 of the motor 45 is not parallel to the rotation shafts 41a and 42a of the rotors 41 and 42.

The transmission mechanism that transmits the rotational force of the motor 45 to the rotors 41 and 42 is not limited to the gear mechanism 50, and may also be a configuration in which the rotational force is transmitted by a pulley and a belt.

The first member 48 may also be formed to cover only over and around the exhaust port 34a. Alternatively, the first member 48 may be disposed inside the exhaust port 34a instead of covering the top of exhaust port 34a.

The first member 48 and the second member 49 are not limited to a sintered material of a stainless steel, and may also be a sintered material of other metals. Further, the first member 48 and the second member 49 are not limited to a sintered material, and may also be a porous material made of ceramic or resin. In this case as well, the same effect as in FIG. 5 can be achieved.

The second member 49 may not be necessarily provided. In this case as well, a noise generated at the exhaust port 34a, which is larger than that generated at the intake port 33a, can be suppressed by the first member 48.

The vacuum pump 30 is not limited to a Roots pump, and may also be a claw pump or a scroll pump, which is a positive displacement rotary pump. In this case as well, air continuously discharged from the exhaust port 34a of the housing 31 can be blown onto the motor 45 to cool the motor 45. Further, a vacuum pump having a check valve or the like and configured such that air is not continuously discharged from the exhaust port 34a of the housing 31, such as a diaphragm pump or a piston pump, may also be used. As long as the vacuum pump is configured to intermittently take in air from the intake port 33a and intermittently discharge air from the exhaust port 34a, the effect of suppressing noise generated at the first member 48 and the second member 49 can be achieved.

The robot 10 is not limited to the vertical articulated robot, and may also be a horizontal or other types of articulated robot.

Further, the suction mechanism according to the present disclosure can also be mounted in robots other than industrial robots, for example, in humanoid robots, or can be mounted in various industrial equipment other than robots, requiring suction work.

REFERENCE SIGNS LIST

10 . . . Robot, 20 . . . Suction hand (robot suction hand), 30 . . . Vacuum pump, 31 . . . Housing, 32 . . . Rotor chamber, 33a . . . Intake port, 34a . . . Exhaust port, 41 . . . First rotor (rotor), 42 . . . Second rotor (rotor), 45 . . . Motor (electric motor), 48 . . . First member (first porous member), 49 . . . Second member (second porous member), 50 . . . Gear mechanism (transmission mechanism), 61 . . . Suction path, 70 . . . Suction cup (suction unit), 78 . . . Case

What is claimed is:

1. A suction hand mountable to an industrial robot and configured to hold a workpiece by suction using a suction unit of the industrial robot, the suction hand comprising:
    a vacuum pump incorporated in the suction hand, the vacuum pump having a housing in which an intake port and an exhaust port are formed, and the vacuum pump being configured to take in air from the intake port and discharge air from the exhaust port;
    a suction path that communicates with the suction unit and the intake port;
    a first member made of a porous material, the first member covering the exhaust port; and
    a second member made of a porous material, the second member covering the intake port.

2. The suction hand according to claim 1, wherein the first member is made of a sintered material of a stainless steel, the sintered material being porous.

3. The suction hand according to claim 2, wherein the exhaust port is formed in an inverted taper shape with a diameter expanding from an inside to an outside of the housing.

4. The suction hand according to claim 2, wherein the housing has a predetermined surface through which the exhaust port is formed, the first member being attached to the predetermined surface such that the first member covers the exhaust port.

5. The suction hand according to claim 2, wherein the suction path has a straight shape, and
    the suction path, the intake port, and the exhaust port are arranged on a same straight line.

6. The suction hand according to claim 2, wherein the vacuum pump is a Roots pump.

7. The suction hand according to claim 2, wherein the first member has internal pores and the second member has internal pores, the internal pores of the first member being smaller in size than the internal pores of the second member.

8. The suction hand according to claim 1, wherein the second member is made of a sintered material of a stainless steel, the sintered material of the second member being porous.

9. The suction hand according to claim 1, wherein the exhaust port is formed in an inverted taper shape with a diameter expanding from an inside to an outside of the housing.

10. The suction hand according to claim 1, wherein the housing has a predetermined surface through which the exhaust port is formed, the first member being attached to the predetermined surface such that the first member covers the exhaust port.

11. The suction hand according to claim 1, wherein the suction path has a straight shape, and
    the suction path, the intake port, and the exhaust port are arranged on a same straight line.

12. The suction hand according to claim 1, wherein the vacuum pump is a Roots pump.

13. The suction hand according to claim 1, wherein the first member has internal pores and the second member has internal pores, the internal pores of the first member being smaller in size than the internal pores of the second member.

14. An industrial robot comprising a suction hand, the suction hand including:
    a suction unit configured to hold a workpiece by suction;
    a housing in which an intake port and an exhaust port are formed; and
    a vacuum pump incorporated in the housing and configured to take in air from the intake port and discharge air from the exhaust port,
    wherein
    the suction unit communicates with the intake port via a suction path,
    the exhaust port is covered with a first member made of a porous material, and
    the intake port is covered with a second member made of a porous material.

* * * * *